United States Patent [19]

Ishikawa et al.

[11] 4,269,714
[45] May 26, 1981

[54] ACTIVATED SLUDGE TREATMENT METHOD OF WASTE WATER

[75] Inventors: Muneharu Ishikawa; Kazuo Kimoto, both of Hiranomachi, Japan

[73] Assignee: Osaka Gas Company, Limited, Osaka, Japan

[21] Appl. No.: 109,626

[22] Filed: Jan. 4, 1980

Related U.S. Application Data

[63] Continuation-in-part of Ser. No. 905,942, May 15, 1978, abandoned.

[30] Foreign Application Priority Data

Apr. 15, 1978 [JP] Japan ................... 53-44708

[51] Int. Cl.³ .............................. C02F 3/26
[52] U.S. Cl. ...................... 210/627; 210/604; 210/629
[58] Field of Search ........................ 210/2-9, 210/14, 15, 195.3, 199, 205

[56] References Cited

U.S. PATENT DOCUMENTS

| | | | |
|---|---|---|---|
| 3,547,811 | 12/1970 | McWhirter | 210/7 |
| 3,547,812 | 12/1970 | McWhirter | 210/7 |
| 3,547,813 | 12/1970 | Robinson et al. | 210/7 |
| 3,547,814 | 12/1970 | McWhirter | 210/7 |
| 3,547,815 | 12/1970 | McWhirter | 210/7 |
| 3,725,258 | 4/1973 | Spector et al. | 210/15 |
| 4,056,465 | 11/1977 | Spector | 210/7 |
| 4,071,443 | 1/1978 | Gorski et al. | 210/15 |
| 4,083,785 | 4/1978 | Bernard et al. | 210/195.3 |

OTHER PUBLICATIONS

Wilcox et al., "The UNOX System–Oxygen Aeration in the Activated Sludge Process", *J. Amer. Chem. Soc.*, 10/1971, pp. 408A–424A.

*Primary Examiner*—Peter A. Hruskoci
*Attorney, Agent, or Firm*—Stevens, Davis, Miller & Mosher

[57] ABSTRACT

An activated sludge treatment method of waste water which comprises (a) the step of micronizing as far as possible the sludge in the waste water containing the BOD component to a degree not to have the cells of the microorganisms therein broken or destroyed and adsorbing the BOD component to the micronized sludge, and (b) the step of oxidizing the BOD component adsorbed to the sludge by blowing in an oxygen-containing gas and flocculating the sludge. By this method, the treatment of waste water is accomplished with a shortened residence time of the waste water in an installation for the treatment and with the production of excess sludge in a considerably reduced amount.

1 Claim, 1 Drawing Figure

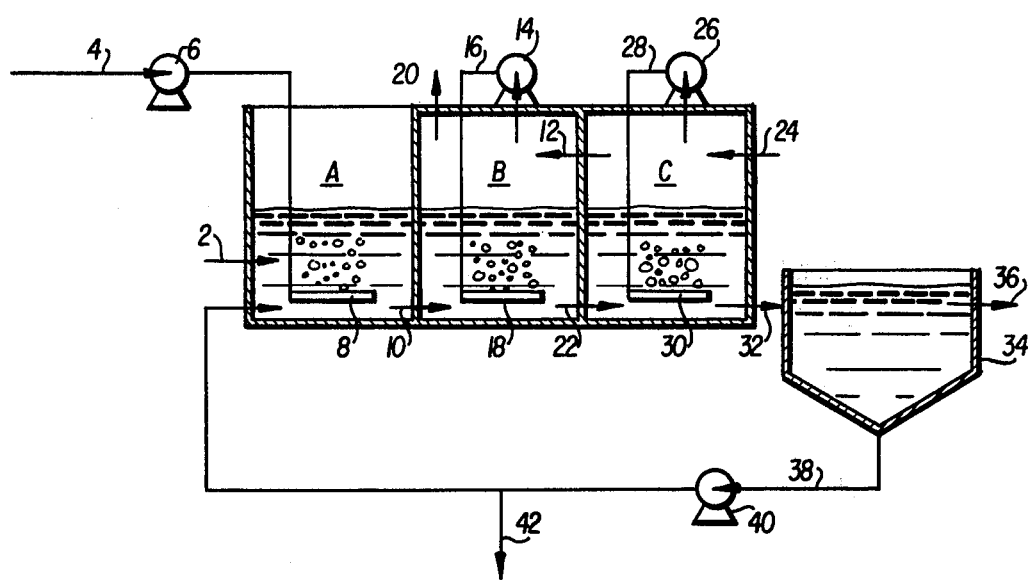

ACTIVATED SLUDGE TREATMENT METHOD OF WASTE WATER

This is a continuation-in-part of our copending application Ser. No. 905,942 filed on May 15, 1978 now abandoned.

The present invention relates to an activated sludge treatment method of waste water. More particularly, it relates to a method for treating waste water with activated sludge which permits the accomplishment of the treatment within a short residence time with production of excess sludge in a reduced amount.

The "activated sludge treatment process" is extensively adopted for treatment of waste water (e.g. municipal sewage, industrial waste water, stockbreeding waste water). However, in conventional methods, there is produced a large amount of excess sludge, and its disposal causes a significant problem. While an attempt has been made to use such excess sludge, for instance, as a fertilizer, this use involves various difficulties both costwise and technically and is not satisfactory. Recently, a separate attempt has been made to reduce the yield of excess sludge so as to avoid the problem on its disposal. From this attempt, there has been developed a method wherein waste water is sent through a plural number of (usually three) closed chambers in order, during which the waste water is contacted with a gas having a high oxygen content under mechanical agitation. In this method, however, the risk of explosion exists due to accumulation of volatile organic materials in the closed chambers. Further, a moving part of the agitation mechanics exists in a gas of high oxygen concentration or a liquid within the closed chambers, and therefore its maintenance and control are considerably difficult.

As the result of an extensive study, it has now been found that the micronization of the sludge in a mixed liquor of waste water with activated sludge and the subsequent oxidation of the BOD components in the mixed liquor accomplishes the treatment of the waste water in a short time while reducing the amount of excess sludge as produced and without accumulation of any volatile organic materials causing the risk of explosion.

In the activated sludge treatment process with air, the sludge once micronized cannot be readily flocculated, and therefore the subsequent deposition and separation of the sludge in the mixed liquor become difficult and take a long time. Thus, the application of any micronization procedure to the sludge has been considered to be disadvantageous from the viewpoint of completion of the treatment within a short period of time.

Recently, there has been developed the activated sludge treatment process with oxygen where a gas having a high oxygen concentration is used in place of air. Even in case of this process, the application of a micronization procedure has been avoided due to the said consideration.

Contrary to the above common consideration, a micronization procedure is now applied positively to a mixed liquor of waste water with activated sludge, whereby the sludge in the mixed liquor is micronized and, due to the increased surface area caused by micronization, the BOD component in the mixed liquor is quickly and efficiently adsorbed on the micronized sludge. When such BOD component adsorbed on the sludge is brought into contact with oxygen, the BOD component is readily and quickly oxidized, during with agitation is carried out as slowly as possible with an extent that a uniform dispersion state of the sludge in the mixed liquor is maintained, whereby the flocculation of the sludge takes place unexpectedly to such a degree as well satisfied. Further, the so-called "auto-oxidation" of the sludge proceeds smoothly and sufficiently. As the result, in comparison with conventional methods, the treatment of the waste water is accomplished within a much shortened period of time producing excess sludge in a considerably reduced amount.

According to the present invention, there is provided a method for activated sludge treatment of waste water which comprises (a) the step of micronizing as far as possible the sludge in a mixed liquor of a waste water containing the BOD component with activated sludge to a degree not to have the cells of the microorganisms therein broken or destroyed and adsorbing the BOD component to the micronized sludge and (b) the step of oxidizing the BOD component adsorbed to the sludge in contact with an oxygen-containing gas and flocculating the sludge.

Throughout the present specification, % is intended to mean % by volume, unless otherwise indicated.

Namely, the method of this invention comprises two steps, of which the former step (a) is concerned with the micronization of the sludge in a mixed liquor of a waste water with activated sludge and the adsorption of the BOD component therein onto the micronized sludge, and the latter step (b) is concerned with the oxidation of the BOD component adsorbed onto the micronized sludge and the flocculation of the micronized sludge.

As the waste water to which the method of this invention is applied, there may be exemplified municipal sewage, industrial waste water, stockbreeding waste water, etc. Prior to the application of the method of the invention, such waste water is usually subjected to preliminary sedimentation, for instance, in a clarifier to deposit the solid components therein. The liquid components as the supernatant or the effluent are then admixed with activated sludge, which is usually return sludge produced as the result of the application of the method of the invention.

The resulting mixed liquor is subjected to micronization in the step (a) of the method of this invention. The micronization may be carried out by various procedures such as mechanical agitation, gas blowing-in agitation and liquid circulation agitation. For efficient and quick adsorption of the BOD component, it is desirable to micronize the floc of the sludge as far as possible. But, the micronization should not be of a degree to break or destroy the cells of the microorganisms (e.g. bacteria, Protozoa, Metazoa, etc.) living in the sludge and cause them to perish. Thus, the micronization may be effected to a degree to make the flock size of the sludge usually about ¼ to 1/20, preferably about 1/5 to 1/10 (sometimes even smaller) of the ordinary floc size (about 200 to 800 microns). More specifically, the sludge may be micronized to give an average floc size of about 160 microns or less, and yet not to break or destroy the cells of the microorganisms. On the micronization, introduction of an oxygen-containing gas into the mixed liquor is not necessary, although it may be made. The time required for the micronization is not specifically limited; preferably such time is from about 5 to 60 minutes. The BOD component in the waste water is thus adsorbed on the micronized sludge efficiently and quickly.

Then, the mixed liquor is subjected to contact with oxygen in the step (b) of the method of the invention. The contact is usually carried out by introduction of an oxygen-containing gas into the mixed liquor, whereby the BOD component adsorbed on the micronized sludge is efficiently and quickly oxidized. In order to enhance the operation or working efficiency, the contact is preferably carried out in a plural treatment zones, especially in two treatment zones. As the oxygen-containing gas, there may be used air or any gas having an oxygen concentration of not less than 21%, preferably of not less than 30%. During the contact, the dissolved oxygen concentration (DO) of the mixed liquor is preferred to be 2 mg/liter or higher.

When the contact is effected, for instance, in two separate treatment zones, the dissolved oxygen concentration of the mixed liquor in the former treatment zone may be maintained at 2 mg/liter or higher by the use of an oxygen-containing gas having an oxygen concentration of not less than 21%, preferably of not less than 30%, and that of the mixed liquor in the latter treatment zone may be kept at 5 mg/liter or higher, preferably at 5 to 15 mg/liter, by the use of an oxygen-containing gas having an oxygen concentration of not less than 35%. The oxygen-containing gas to be introduced into the former treatment zone may come from the outside of the system and/or led from the latter treatment zone. Naturally, the oxygen-containing gas to be introduced into the latter treatment zone comes from the outside of the system. In the former and latter treatment zones, the oxygen-containing gas is usually circulated and blown into the mixed liquor with repetition. In such case, the said oxygen concentration of the oxygen-containing gas indicates that of the circulating gas. In case of such circulating use, the oxygen-containing gas to be introduced into the latter treatment zone is preferred to have an oxygen concentration of 40% or higher and may be pure oxygen. During the circulation of the oxygen-containing gas through the mixed liquor, the mixed liquor is agitated as slowly as possible with such an extent that the micronized sludge is kept in a uniformly dispersed state in the mixed liquor, whereby not only the oxidation of the BOD component adsorbed onto the micronized sludge but also the flocculation of the micronized sludge and the auto-oxidation of the flocculated sludge proceed.

The mixed liquor is then subjected to sedimentation, whereby the flocculated sludge is deposited. The liquid components as the supernatant or the effluent is discharged to the outside of the system. A most portion of the deposited sludge is used as return sludge for treatment of waste water, and the remainder is discharged as the excess sludge to the outside of the system.

The present invention will be explained herein below in further detail in reference to the accompanying drawing which shows a flow chart of an embodiment of the invention.

In this embodiment, aeration of waste water is carried out in three treatment zones (A), (B) and (C). Into the first treatment zone (A), there are introduced the raw waste water through the line (2) and the sludge returned from the settling tank (34) through the line (38), and the resulting mixed liquor is subjected to aeration. The first treatment zone (A) is an open type, wherein an oxygen-containing gas introduced through the line (4) and the blower (6) is vigorously blown into the mixed liquor through the diffuser (8) for aeration, whereby agitation of the mixed liquor is simultaneously realized. Alternatively, aeration and agitation may be achieved by the use of an ejector, a premixing nozzle or any other conventional equipment. Further, mixing and stirring may be carried out by the aid of a mechanical agitator as optionally provided. Blowing-in of the gas in the first treatment zone (A) is effective in micronizing the sludge to increase the surface area thereof and elevating the adsorption rate of the BOD component thereto. In the first treatment zone (A), it is important that the adsorption of the BOD component to the sludge is sufficiently made, and no special consideration need be given to the dissolved oxygen concentration in the mixed liquor. When dissolved oxygen is present to some degree, the initial oxidation of the BOD component takes place.

Since the first treatment zone (A) is an open type wherein the aerated gas is discharged in one pass, it is free from accumulation of carbon dioxide or volatile organic materials, so that lowering of the pH of the mixed liquor, danger of the explosion, etc. can be obviated. The gas to be blown into the first treatment zone (A) may be any gas containing oxygen insofar as it does not give an ill effect to the activated sludge treatment. Usually, the gas is air. The gas may be the one discharged from the second treatment zone (B) admixed or not with any other gas such as air or oxygen. The residence time of the mixed liquor in the first treatment zone (A) may vary to a great degree depending on the amount of the raw waste water, the quality of the raw waste water, the concentration of the sludge, the amount of the blown-in gas, etc. The residence time is usually within a range of 5 to 60 minutes. When the residence time is over 60 minutes, the capability of the sludge for oxidation of the BOD component is generally reduced, and the sedimentation of the sludge in the settling tank is deteriorated. Usually not less than 50%, preferably not less than 60%, of the BOD component to be eliminated is adsorbed on the sludge and removed from the waste water in the first treatment zone (A). Thus, the residence time of the waste water in the first treatment zone (A) is normally not more than $\frac{1}{4}$, preferably not more than $\frac{1}{6}$, of the total residence time from the first treatment zone (A) to the third treatment zone (C).

The mixed liquor flows from the first treatment zone (A) through the communicating part (10) into the second treatment zone (B) of closed type where aeration is carried out with circulation of an oxygen-containing gas blown in through the diffuser (18), whereby the BOD component adsorbed to the sludge is oxidized while the flocculation of the sludge proceeds. The gas blowing-in is to be carried out as slowly as possible within the range to keep the evenly dispersing state of the sludge in the mixed liquor. Also, in order to supply a sufficient amount of oxygen for oxidation of the BOD component with progress of flocculation of the sludge, gas blowing-in must be effected so as to make a dissolved oxygen concentration of not less than 2 mg/liter in the mixed liquor. As to the blown-in gas, it is economically advantageous to use the gas discharged from the third treatment zone (C) by introducing it through the communicating part (12) to the second treatment zone (B). However, when the oxygen supply is insufficient, a gas having a high oxygen concentration may additionally be supplied to the said zone from the outside. Generally, it is desirable that the oxygen concentration in such blown-in gas is not less than 30%.

In the second treatment zone (B), the gas is blown in by circulation through the blower (14), the line (16) and the diffuser (18), in the course of which the amount corresponding to the inflow through the communicating part (12) (in case of the supply of a gas from the outside, the combination of the inflow through the communicating part (12) and of the supply from the outside) is discharged through the line (20) to the outside. The residence time of the mixed liquor in the second treatment zone (B) may vary extensively depending on various factors and, in case of ordinary municipal sewage, it will take about 20 to 80 minutes. Usually not less than 90% of the BOD component to be eliminated is oxidized in the second treatment zone (B).

From the second treatment zone (B), the mixed liquor flows into the third treatment zone (C) of closed type through the communicating part (22), and an oxygen-containing gas is blown in through the diffuser (30) for aeration, whereby the flocculation of the sludge proceeds and the auto-oxidation of the flocculated sludge is achieved. Accordingly, in order to keep the evenly dispersed state of the sludge in the mixed liquor and to keep the more flocculated sludge aerobic up to its inside, the third treatment zone (C) requires to have a higher dissolved oxygen concentration than the second treatment zone (B). For this purpose, the dissolved oxygen concentration in the mixed liquor must be kept at 5 mg/liter or higher. However, when the dissolved oxygen concentration is too high, the sludge is micronized by excessive auto-oxidation, involving such defects that a long time is required for sedimentation and the micronized sludge is apt to flow out into the effluent. It is therefore desirable to keep a dissolved oxygen concentration of 15 mg/liter or less. When the dissolved oxygen concentration is within a range of about 5 to 15 mg/liter, aggravation of sedimentation of the sludge to be caused by generation of gas, generation of filamentous microorganisms, etc., resulting from that the inside of the sludge becomes anaerobic, can be avoided.

In order to accelerate the flocculation of the sludge in the third treatment zone (C), agitation must be made slowly to a degree to make the sludge in the mixed liquor evenly dispersed while the dissolved oxygen concentration is maintained at 5 mg/liter or higher. For this purpose, the oxygen concentration in the gas to be blown by circulation must be 35% or higher. In order words, in order to maintain the dissolved oxygen concentration at 5 mg/liter or higher by means of a circulating gas having an oxygen concentration of less than 35%, circulation must be carried out vigorously, which however causes micronization of the sludge and aggravation of the sedimentation. In the third treatment zone (C), in order to maintain the oxygen concentration of the gas blown in by circulation to 35% or higher and to replenish the amount of the gas discharged to the second treatment zone (B), a gas having a high oxygen concentration is appropriately replenished through the line (24). The oxygen concentration and amount of the gas to be replenished may be determined by the dissolved amount of oxygen in the second and third treatment zones (B) and (C), the amount of consumption of oxygen in the second and third treatment zones (B) and (C), the properties of the mixed liquor in the second and third treatment zones (B) and (C), and the amount of discharge through the line (20), etc. Preferably, the oxygen concentration of the gas is 40% or higher. Replenishment of the gas to the third treatment zone (C) can be made by various procedures, e.g. admixing the gas discharged from the second treatment zone (B) with a gas having a high oxygen concentration; releasing a part of the gas discharged from the second treatment zone (B) to atmosphere and admixing the remainder with a gas having a high oxygen concentration; eliminating carbon dioxide, etc. from the gas discharged from the second treatment zone (B) and admixing the resultant gas with a gas having a high oxygen concentration, etc. In the third treatment zone (C), the blown-in gas is blown in by circulation through the blower (26), the line (28) and the diffuser (30). The residence time of the mixed liquor in the third treatment zone (C) is variable to a large degree and, in case of ordinary municipal sewage, will be within a range of about 20 to 120 minutes. This total residence time of the mixed liquor from the first treatment zone (A) to the third treatment zone (C) is usually in a range of about 1 to 4 hours, which is remarkably shortened in comparison with the residence time in conventional methods.

The mixed liquor which has completed the oxidation of the BOD component as well as the flocculation of the sludge is then sent from the third treatment zone (C) to the settling tank (34) through the line (32) for sedimentation. The supernatant or the effluent is discharged from the settling tank (34) through the line (36). The settled sludge is taken out from the settling tank (34) through the line (38) and the pump (40), and its majority part is sent back to the first treatment zone (A). A small amount of excess sludge (approximately 0.2 to 0.5 kg MLSS/kg BOD) is discharged through the line (42).

In the present invention, various control factors (i.e. residence time, amount of gas to be blown in, oxygen concentration, etc.) are determined in the following manner. Firstly, in reflection of the water quality of the raw waste water to be treated (e.g. BOD value, BOD component, etc.), the residence time and the agitation conditions in the first treatment zone are determined while taking into consideration the BOD component to be adsorbed in the first treatment zone. Then, in consideration of the amount of removal of the BOD component in the second and third treatment zones, the required dissolved oxygen concentration (not less than 2 mg/liter and not less than 5 mg/liter, respectively), and the time required for flocculation and oxidation of the BOD component and the aeration conditions in the two treatment zones, there are determined the residence time in the two treatment zones, the oxygen concentration of the gas to be blown into the two treatment zones, and the oxygen concentration and the amount of supply of the gas to be replenished to the third treatment zone.

The method of the present invention has the following advantages:

(1) The yield of excess sludge is extremely small;

(2) No volatile organic material is accumulated, no danger of explosion is present and high treatment efficiency can be maintained;

(3) The use of a gas having a low oxygen concentration and the co-use of air are admitted so that the operating cost is much saved;

(4) In conventional methods, a mechanical agitator is equipped in a closed tank where a gas of high oxygen concentration and the mixed liquor having a high concentration of dissolved oxygen are present, and its maintenance and control is accompanied with great difficulty; in the present invention method, any mechanical agitator is usually not equipped in the treatment zones of closed type so that the difficulty for the maintenance and control of such agitator can be avoided;

(5) The residence time of the waste water to be treated is much shortened.

Practical and presently preferred embodiments of the present invention are illustratively shown in the following Examples.

EXAMPLE 1

This Example shows the activated sludge treatment of municipal sewage by the use of an aeration tank of pilot plant scale (1 m×5 m×2 m).

The aeration tank was divided into three sectional zones, of which the first one was constructed in an open type (1 m×1 m×2 m) (hereinafter referred to as "the 1st chamber"), the second one was constructed in a closed type (1 m×2 m×2 m) (hereinafter referred to as "the 2nd chamber") and the third one was constructed in a closed type (1 m×2 m×2 m) (hereinafter referred to as "3rd chamber").

The raw waste water (BOD, 120 ppm; temperature, 25° C.) obtained by preliminary treatment of the municipal sewage in a preliminary clarifier and the return sludge (sludge concentration, 16,000 mg/liter) were introduced into the 1st chamber at flow rates of 2.25 m$^3$/hr and 0.75 m$^3$/hr, respectively. Air was blown into the mixed liquor through a diffuser at a flow rate of 40 Nm$^3$/hr, whereby the sludge was micronized, and the BOD component was adsorbed on the micronized sludge. The dissolved oxygen concentration of the mixed liquor was 0.05 mg/liter, and the residence time of the mixed liquor in the 1st chamber was 30 minutes. Microscopic observation of a sample taken from the mixed liquor revealed the presence of Protozoa such as Ciliates and Flagellates, Rotifera, etc. and the micronization of the floc of bacteria to a range of about 10 to 50 microns.

Then, the mixed liquor, of which the BOD value was 27 ppm, was transferred to the 2nd chamber where circulating aeration was carried out by the use of a gas discharged from the 3rd chamber, whereby slow agitation took place and under which the flocculation of the sludge proceeded. The oxygen concentration of the circulating gas was 35%, and the flow rate was 8 Nm$^3$/hr. The dissolved oxygen concentration of the mixed liquor was 2.2 mg/liter, and the residence time of the mixed liquor in the 2nd chamber was 1 hour.

Then, the mixed liquor, of which the BOD value was 21 ppm, was transferred to the 3rd chamber where circulating aeration was carried out by the use of oxygen-enriched air having an oxygen concentration of 55% supplied thereto, whereby slow agitation took place and under which the oxidation of the BOD component, the flocculation of the sludge and the auto-oxidation of the flocculated sludge proceeded. The oxygen concentration of the circulating gas was 50%, and the flow rate was 6 Nm$^3$/hr. The dissolved oxygen concentration of the mixed liquor was maintained at 5.3 mg/liter, and the residence time of the mixed liquor in the 3rd chamber was 1 hour. At the exit of the 3rd chamber, the floc of the sludge showed about 300 microns in average size.

The thus aerated mixed liquor from the 3rd chamber was introduced into a settling tank where the sludge was deposited. The supernatant showing a BOD value of 17 ppm could be discharged as such. A most part of the sludge was returned to the 1st chamber.

The SVI value, which is an index of sludge settleability, was 46 on the mixed liquor flowed out from the 3rd chamber. The yield of the excess sludge was 0.34 kg MLSS/kg BOD. The BOD sludge load was 0.20 kgBOD/kg MLSS.day.

EXAMPLE 2

This Example shows the activated sludge treatment of a waste water produced at the food industries by the use of an aeration tank of pilot plant scale (1.5 m×6 m×3 m).

The aeration tank was divided into three sectional zones, of which the first one was constructed in an open type (1.5 m×0.6 m×3 m) (hereinafter referred to as "the 1st chamber"), the second one was constructed in a closed type (1.5 m×2.4 m×3 m) (hereinafter referred to as "the 2nd chamber") and the third one was constructed in a closed type (1.5 m×3 m×3 m) (hereinafter referred to as "the 3rd chamber").

The raw waste water (BOD, 640 ppm; temperature, 28° C.) obtained by preliminary treatment of the waste water in a preliminary clarifier and the return sludge (sludge concentration, 20,000 mg/liter) were introduced into the 1st chamber at flow rates of 8 m$^3$/hr and 2.7 m$^3$/hr, respectively. While the mixed liquor was agitated by the use of an agitator rotating at a rate of 150 rpm, air was blown therein through a diffuser at a flow rate of 6 Nm$^3$/hr for aeration, whereby the sludge was micronized, and the BOD component was adsorbed on the micronized sludge. The dissolved oxygen concentration of the mixed liquor was so low as could not be detected, and the residence time of the mixed liquor in the 1st chamber was 12 minutes. The floc of bacteria was not more than about 50 microns in average size, while Protozoa, Metazoa, etc. having a size larger than about 50 microns were alive without breakage or destruction of their cells.

Then, the mixed liquor, of which the BOD value was 80 ppm, was transferred to the 2nd chamber where circulating aeration was carried out by the use of a gas discharged from the 3rd chamber, whereby slow agitation took place and under which the oxidation of the BOD component and the flocculation of the sludge proceeded. The oxygen concentration of the circulating gas was 43%, and the flow rate was 6 Nm$^3$/hr. The dissolved oxygen concentration of the mixed liquor was 3.5 mg/liter, and the residence time of the mixed liquor in the 2nd chamber was 48 minutes.

Then, the mixed liquor, of which the BOD value was 30 ppm and in which the floc of bacteria showed about 200 microns in average size, was transferred to the 3rd chamber where circulating aeration was carried out by the use of pure oxygen supplied thereto, whereby slow agitation took place and under which the oxidation of the BOD component, the flocculation of the sludge and the auto-oxidation of the flocculated sludge proceeded. The oxygen concentration of the circulating gas was 72%, and the flow rate was 6 Nm$^3$/hr. The dissolved oxygen concentration of the mixed liquor was 12 mg/liter, and the residence time was 1 hour. At the exit of the 3rd chamber, the floc of the sludge showed about 400 microns in average size.

The thus aerated mixed liquor from the 3rd chamber was introduced into a settling tank where the sludge was deposited. The supernatant showing a BOD value of 20 ppm could be discharged as such. A most part of the sludge was returned to the 1st chamber.

The SVI value was 54 on the mixed liquor flowed out from the 3rd chamber. The yield of the excess sludge was 0.46 kgMLSS/kg BOD.

EXAMPLE 3

This Example shows the activated sludge treatment of municipal sewage by the use of an aeration tank of pilot plant scale (1 m×4.5 m×2 m).

The aeration tank was divided into three sectional zones, of which the first one was constructed in an open type (1 m×1 m×2 m; water depth, 1.5 m) (hereinafter referred to as "the 1st chamber"), the second one was constructed in a closed type (1 m×1.5 m×2 m; water depth, 1.5 m) (hereinafter referred to as "the 2nd chamber") and the third one was constructed in a closed type (1 m×2 m×2 m; water depth, 1.5 m) (hereinafter referred to as "the 3rd chamber").

The aeration tank was operated as in Example 1 so as to reduce the BOD value of the raw waste water from the municipal sewage from 120 ppm to 15 ppm.

The operation conditions and the obtained results in the case where vigorous mechanical agitation was carried out in the 1st chamber (Example 3) and those in the case where such agitation was not carried out (Comparative Example) are shown in the following table:

|  |  | Example 3 | Comparative Example0 |
|---|---|---|---|
| Treating conditions | 1st chamber | 1.5 Nm³/hr air blown in; mechanical agitation at 100 rpm | 1.5 Nm³/hr air blown in |
|  | 2nd chamber | O₂ 45% gas blown in by circulation at 1 Nm³/hr | O₂ 45% gas blown in by circulation at 1 Nm³/hr |
|  | 3rd chamber | O₂ 73% gas blown in by circulation at 1 Nm³/hr | O₂ 73% gas blown in by circulation at 1 Nm³/hr |
| MLSS concentration in tank |  | 5000 mg/liter | 5000 mg/liter |
| Dissolved oxygen concentration | 1st chamber | 0.5 mg/liter | 1.0 mg/liter |
|  | 2nd chamber | 3 mg/liter | 3.5 mg/liter |
|  | 3rd chamber | 10 mg/liter | 12 mg/liter |
| Raw waste water flow rate |  | 4.5 m³/hr | 3.4 m³/hr |
| Residence time |  | 1.5 hours | 2 hours |
| BOD | Raw waste water | 120 ppm | 120 ppm |
|  | Treated water | 15 ppm | 16 ppm |
| SVI |  | 63 | 78 |
| Yield of excess sludge |  | 0.46 kg MLSS/kg BOD | 0.51 kg MLSS/kg BOD |
| Size of floc in 1st chamber |  | 40 microns in average | 200 microns in average |

Note:
*Circulating aeration was carried out by supplying an oxygen-containing gas so as to make the oxygen concentration of the blow-in gases in the 2nd and 3rd chambers same as in Example 3.

From the above results, it is understood that, in the case where the sludge is micronized at the initial stage of aeration according to the present invention, the residence time is shortened and the yield of the excess sludge is decreased.

In the foregoing descriptions, the present invention has been explained mainly on the basis of the embodiments wherein the latter stage, i.e. the oxidation of the BOD component and the flocculation of the sludge, is practised in two separate treatment zones. However, the said stage may be practised in a single treatment zone. For example, by the use of a single treatment zone of tower type, the oxidation of the BOD component adsorbed to the sludge, the flocculation of the sludge, and the auto-oxidation of the flocculated sludge may be carried out. In this case, an oxygen-containing gas is blown in from the bottom (and side wall) of the tower. With the oxidation of the BOD component adsorbed to the sludge, flocculation of the sludge progresses, and the flocculated sludge comes to settle from the upper part to the lower part. The dissolved oxygen concentration is higher in the mixed liquor as it is situated at a lower position in the tower, so that the auto-oxidation of the sludge and the sedimentation of the sludge can be realized with good efficiency.

What is claimed is:

1. A method for treatment of waste water containing a BOD component with activated sludge which comprises introducing said waste water and an effective amount of said activated sludge to adsorb said BOD component into a first open treatment zone, micronizing said activated sludge in the waste water in said first open treatment zone to an average floc size of about 160 microns or less but not to such a degree as to have the cells of microorganisms therein broken or destroyed and adsorbing the BOD component on the micronized sludge; transferring the thus treated sludge-containing water to a second substantially closed treatment zone and bringing it into contact with an oxygen-containing circulating gas having an oxygen concentration of not less than 30% by volume to oxidize the BOD component adsorbed on the sludge with flocculation of the sludge under the condition of the dissolved oxygen concentration being not less than 2 mg/liter, during which the sludge-containing water is slowly agitated by the oxygen-containing circulating gas to permit flocculation of the sludge and to maintain the flocculated sludge in an evenly dispersed state; transferring the thus treated sludge-containing water to a third substantially closed treatment zone and bringing it into contact with an oxygen containing circulating gas having an oxygen concentration of not less than 35% by volume to oxidize the BOD component adsorbed on the sludge, accelerate the flocculation of the sludge and auto-oxidize the flocculated sludge under the condition of the dissolved oxygen concentration being not less than 5 mg/liter, during which the sludge-containing water is slowly agitated by the oxygen-containing circulating gas to accelerate the flocculation of the sludge and maintain the flocculated sludge in an evenly dispersed state; and then introducing the thus treated sludge-containing water into a settling tank to settle the sludge and discharging the resulting supernatant liquid from the settling tank while recycling at least a portion of the settled sludge to the first open treatment zone.

* * * * *

UNITED STATES PATENT AND TRADEMARK OFFICE
CERTIFICATE OF CORRECTION

PATENT NO. : 4,269,714
DATED : May 26, 1981
INVENTOR(S) : ICHIKAWA ET AL

It is certified that error appears in the above–identified patent and that said Letters Patent are hereby corrected as shown below:

The inventor's name should be "M. Ichikawa" and not 'M. Ishikawa' as printed on the patent.

Signed and Sealed this

Twenty-ninth Day of September 1981

[SEAL]

Attest:

GERALD J. MOSSINGHOFF

Attesting Officer — Commissioner of Patents and Trademarks